United States Patent [19]

Gergely

[11] Patent Number: 4,918,303

[45] Date of Patent: Apr. 17, 1990

[54] DETECTING DISTURBANCE WITH CROSS POLARIZED FIBER OPTIC SENSING

[75] Inventor: John S. Gergely, Ponca City, Okla.

[73] Assignee: Conoco Inc., Ponca City, Okla.

[21] Appl. No.: 351,237

[22] Filed: May 11, 1989

[51] Int. Cl.⁴ .............................................. H01J 5/16
[52] U.S. Cl. ........................ 250/227.17; 250/225; 250/231.19; 73/516 LM; 73/653
[58] Field of Search ............... 250/225, 227, 231 R; 73/516 LM, 517 R, 653, 655, 657; 356/350, 351

[56] References Cited

U.S. PATENT DOCUMENTS

| | | | |
|---|---|---|---|
| 4,322,829 | 3/1982 | Davis, Jr. et al. | 73/653 |
| 4,363,114 | 12/1982 | Bucaro et al. | 73/655 |
| 4,422,167 | 12/1983 | Shajenko | 73/655 |
| 4,428,234 | 1/1984 | Walker | 73/653 |
| 4,442,350 | 4/1984 | Rashleigh | 250/227 |
| 4,443,700 | 4/1984 | Macedo et al. | 250/227 |
| 4,447,117 | 5/1984 | Bobb | 350/96.15 |
| 4,495,411 | 1/1985 | Rashleigh | 250/227 |
| 4,519,252 | 5/1985 | McMahon | 250/231 P |
| 4,613,752 | 9/1986 | Davis | 73/516 LM |
| 4,617,113 | 6/1987 | Carome | 250/227 |
| 4,642,458 | 7/1987 | Jackson et al. | 250/225 |
| 4,799,752 | 1/1989 | Carome | 73/657 |
| 4,829,821 | 5/1989 | Carome | 250/227 |
| 4,841,774 | 6/1989 | Hall | 73/517 R |

Primary Examiner—David C. Nelms
Assistant Examiner—Stephone B. Allen

[57] ABSTRACT

Apparatus for determining physical parameters of a disturbance using a fiber optic coil and linearly polarized source light. The apparatus directs a linearly polarized source light through the fiber optic coil being effected by a disturbance, and then measures the effect by comparing optically the source light and the light affected by changes in fiber coil index to detect and develop digital data related to frequency and amplitude of the disturbance.

11 Claims, 3 Drawing Sheets

DETECTING DISTURBANCE WITH CROSS POLARIZED FIBER OPTIC SENSING

CROSS-REFERENCE TO RELATED APPLICATIONS

The present application is closely related to concurrently filed applications entitled "METHOD AND APPARATUS FOR SENSING DISTURBANCE USING FIBER-OPTIC POLARIZATION ROTATION" (ICR 7622-24) and "DETECTING DISTURBANCE USING PHOTO-OPTIC GAP SENSING" (ICR 7623-25-28).

BACKGROUND OF THE INVENTION

1. Field of the Invention

The invention relates generally to a technique for sensing minute disturbances such as shear waves, pressure changes, acoustic signals and the like and more particularly, but not by way of limitation, it relates to method and apparatus using linearly polarized light waves to derive an electric field vector indication of the change in length of a single-mode polarization-preserving fiber-optic cable.

2. Description of the Prior Art

The prior art includes various types of disturbance sensing systems that utilize fiber-optic sensing elements and cables of one type or another. Such systems of recent development use fiber-optic sensors to provide an indication of the change in length of a single-mode fiber cable that is influenced by the environment to exhibit a change in the phase of a light travelling through it. Light leaving the end of the fiber cable is then sensed for combination with light coming from a reference fiber cable that was isolated from the environment. The combination of the two light waves will then result in a high or low value of light due to constructive or destructive interference, and the resulting light level is related to the pressure that is exerted on the fiber-optic cable by the environment. U.S. Pat. No. 4,420,260 provides a representative teaching of the general class of phase-change sensing devices. These types of devices do not have the capability of accurately determining the frequency and amplitude of the sensed disturbance.

SUMMARY OF THE INVENTION

The present invention relates to a form of environmental disturbance detection using linearly polarized light and either one or two fiber optic coils for derivation of change in length (or index) data. Sensed light and reference light are then combined in such manner as to superimpose the respective electric field vectors so that the resultant electric field forms a Lissajous pattern projection on a polarizer, and an output from the polarizer is sensed by a photo-detector which provides an A-C coupled current output, a measurement that can be processed to yield both frequency and amplitude of the sensed disturbance.

Therefore, it is an object of the present invention to provide a method for sensing extremely minute disturbances or vibrations.

It is also an object of the invention to provide sensing apparatus capable of determining both amplitude and frequency of minute vibrations.

It is still another object of the present invention to provide a fiber optic sensor that is capable of extreme miniaturization for placement in confied locations.

Finally, it is an object of the present invention to provide a fiber-optic detector of extremely high sensitivity and reliability for use with orbital shear wave logging equipment and such as vertical seismic profile (VSP) applications.

Other objects and advantages of the invention will be evident from the following detailed description when read in conjunction with the accompanying drawings which illustrate the invention.

DETAILED DESCRIPTION OF THE INVENTION

Figure 1:
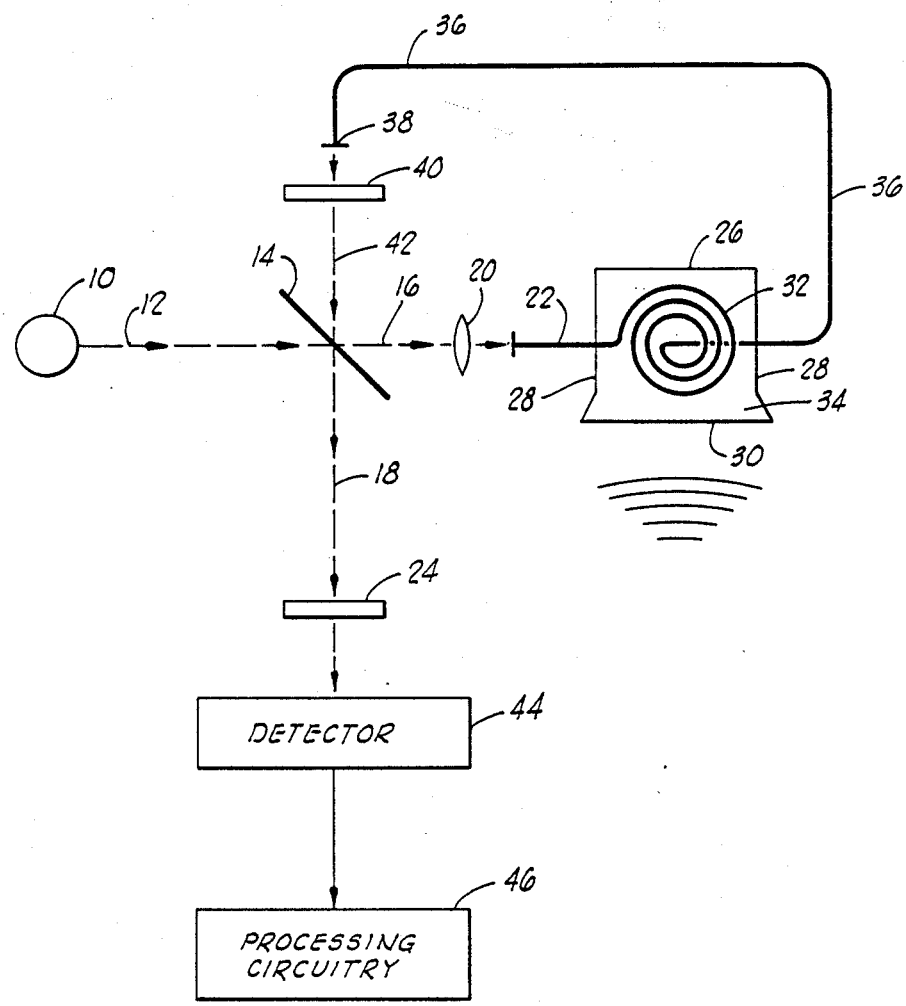
FIG. 1 is a schematic illustration of a fiber-optic sensor constructed in accordance with the present invention.

Referring to FIG. 1, a selected light source 10 provides an operative output beam 12 to provide the source light for the sensor structure. The light source 10 should be a single-frequency, coherent, linearly polarized light source, and it may be such as a commercially available type of semiconductor laser. The output light beam 12 is directed through a beam splitter 14 whereupon the beam 12 is split into the continuing direct beam 16 and reflected beam 18. The direct beam 16 is focused through a lens 20 into a fiber-optic cable 22, a single-mode, polarization-preserving fiber cable. The reflected beam 18 is then directed on to a polarizer 24, as will be further described below.

The actual sensing structure consists of a suitable container 26 having side wall 28 and a flexible diaphragm 30 completing the closure. The optic cable 22 is formed into a coil 32 having a selected number of turns and being disposed within a suitable coupling fluid 34 retained within the diaphragmatic enclosure 26. The extending or remaining optic cable end 36 is then led back to a position 38 illuminating a half-wave plate 40 to produce a beam 42 for projection through beam splitter 14 in alignment with reflected beam 18.

The reflected beam 18, also including a portion of reactive beam 42, is directed through polarizer 24 for illumination of a photoelectric detector 44. The detected output from detector 44 is then applied through processing circuitry 46 to determine the frequency and amplitude of any pressure variation affecting diaphragm 30. In practice, the sensor of FIG. 1 provides a very good seismic signal detector, as used either on the ground surface or downhole, as the diaphragm 30 is capable of picking up very minute signal vibrations which are propagated through the fluid medium 34 to affect the index or length of fiber-optic coil 32.

In operation, both the reference light and the reactive light are provided from source 10 as the reference light is reflected from beam splitter 14 along beam 18 to polarizer plate 24. The reactive light portion of beam 12 is transmitted through beam splitter 14 and lens 20 into the fiber cable 22 through the fiber-optic coil 32 wherein the effects of disturbance sensed at diaphragm 30 will be encountered. Thus, the length or index of fiber-optic coil 32 will be varied in proportion with any disturbance and this light indication will propagate along optic cable 36 to position 38 where it is directed through the half-wave plate 40. The half-wave plate 40 effects a 90° phase shift as seen along beam 42 through beam splitter 14. Thus, the reflected beam 18 will consist of reference light from beam 12 along with 90° shifted light from beam 42 which also bears the effects of any change introduced by optic coil 32. When the rotated light on beam 42 is superimposed with the reference light from beam 12 on the surface of polarizer 24, the resultant E-field concentration traces out a Lissajous pattern on polarizer 24. The Lissajous pattern is traced out on the polarizer 24 because the E-field components of the reference beam 12 and the sensed beam 42 will be of the same frequency and shifted in phase. Thus, a circle will be traced out when the phase difference is 90° between the equal orthogonal components.

When the polarization axis of polarizer 24 is placed midway between the orthogonal E-field vectors transmitted along beam 18, an expression can be derived for the A-C coupled current output from detector 44 which current output signal may then be processed variously in processing circuitry 46 to derive output data indications as to frequency, magnitude, etc.

The configuration uses standard interferometric techniques as the two aligned, linearly polarized light waves are processed. The E-field from the reactive beam portion of beam 18 may be designated as $$\bar{E}_F = \hat{a}_x \{\cos [\omega t - k_o \Delta z(t)]\} \quad (1)$$

and the reference beam portion of beam 18 may be $$\bar{E}_R = \hat{a}_x \cos \omega t \quad (2)$$

Thus, the total E-field as seen by the detector 44 is $$\bar{E}_{TD} = \hat{a}_x \{\cos [\omega t - k_o \Delta z(t)] + \cos \omega t\} \quad (3)$$

The time-averaged power at the detector then will be $$\bar{P}_D = \tfrac{1}{2} R_e(\bar{E}_{TD} \times \bar{H}_{TD}^*) \quad (4)$$

or $$\bar{P}_D = \hat{a}_z 1/\eta [1 + \cos k_o \Delta z(t)](\text{watts/m}^2) \quad (5)$$

where $\eta^2 = \mu/\epsilon$, is the permeability over the permitivity of the gap material. $\Delta z(t)$ is the time rate of change in gap size. AC coupling can be used at the output of the detector to obtain $\Delta z(t)$ directly, and this may be shown as $$I_D = A/\eta \cos k_o \Delta z(t) \text{ (amps)} \quad (6)$$

where A is a constant of the detector for the light wavelength used. Thus, Equation (6) gives a direct relationship between the output current of detector 44 and the change in index or length of the fiber-optic coil 32.

The expression of Equation (6) relates the output current waveform to the change in fiber length, i.e., the fiber-optic coil 32 experiencing the pressure changes in fluid 34. The expression is valid only over a length change smaller than $\lambda/2$ where $\lambda$ is the wave length of the light being used. Thus, it can be appreciated that the sensing of such minute dimensions as one-half wave length for wave lengths of extremely high light frequencies is indeed a sensitive matter. To overcome limitations where length changes may be greater, a configuration such as that shown in FIG. 2 is utilized to effect "handedness" detection using two polarizers.

Figure 2:
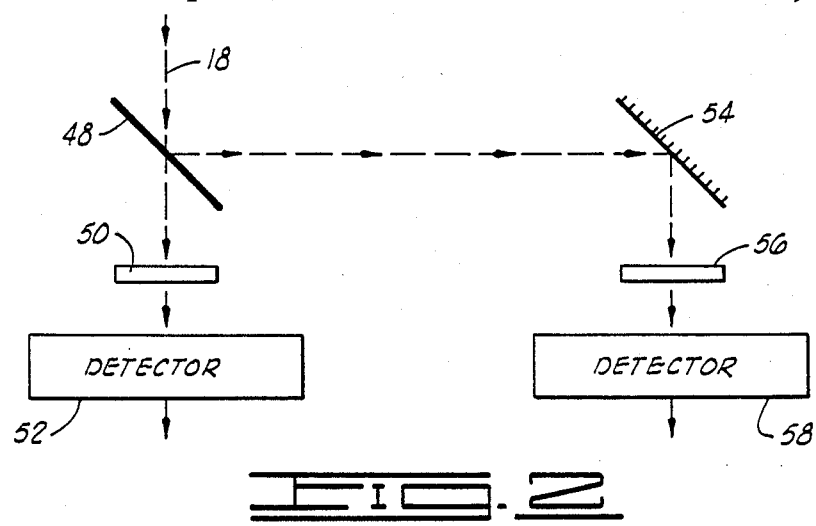
FIG. 2 is an alternative form of detector structure shown in schematic form.

Referring to FIG. 2, the light beam 18 (see FIG. 1) containing the reference light from beam 12 as well as reactive light from beam 42 is passed through a beam splitter 48 which passes a portion of the light beam through a polarizer 50 onto a detector 52. A remaining portion of light beam 18 is then reflected from a 45° aligned mirror 54 through a polarizer 56 to a detector 58. The polarization axes between the polarizers 50 and 56 are adjusted to be offset by an angle somewhat less than 90°. In this way, the outputs of the detectors will be A-C coupled current indications in the form given by equation 6, but with one leading the other in phase.

The processing circuitry 46 may then function to determine the frequency of the signal being detected by measuring the time to hen the signals change relative phase, this time will equal one-half the period of the detected disturbance signal. The amplitude may then be determined by a digital process of counting the number of zero crossings or maxima up until the time of change of relative phase.

Figure 3:
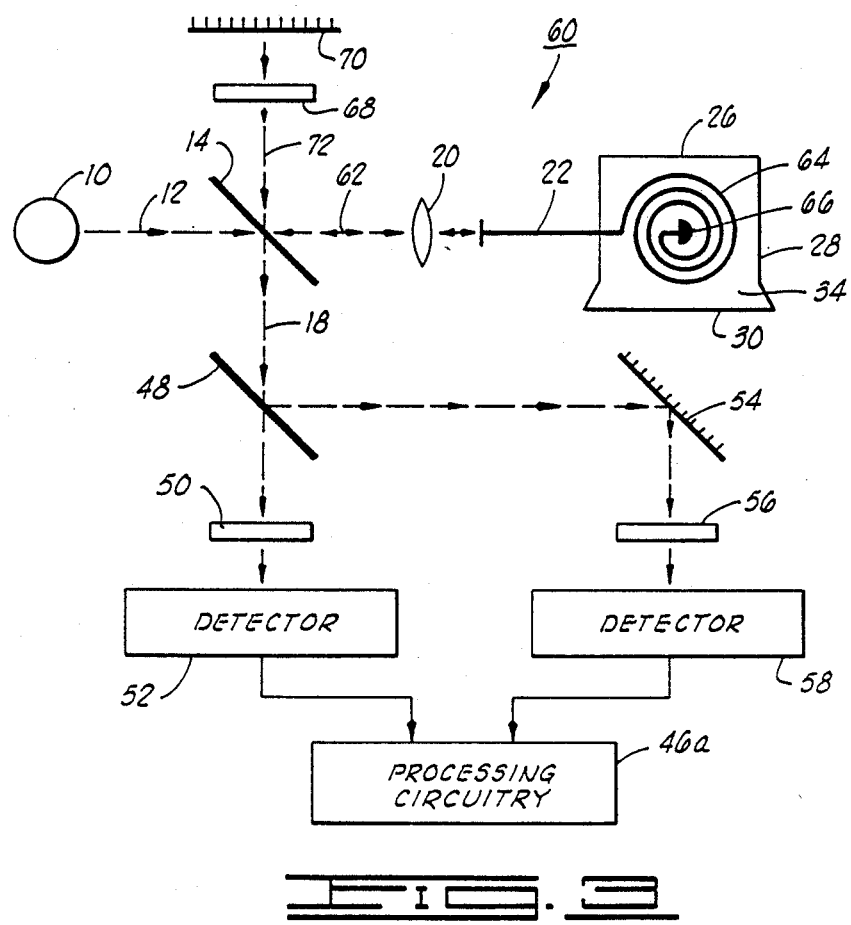
FIG. 3 is a schematic drawing of an alternative form of fiber-optic sensor utilizing a reflective optical cable.

FIG. 3 illustrates an alternative form of fiber-optic sensor 60 that utilizes a different form of fiber-optic coil and a different means of deriving the reactive light. Like components from FIGS. 1 and 2 are numbered the same. In sensor 60 the source light beam 12 is transmitted through beam splitter 14 with partial reflection via beam 18 but a continuing direct beam 62 is focused through lens 20 onto the end of fiber-optic cable 22. In this case, a fiber-optic coil 64 is formed for immersion in coupling fluid 34 within enclosure 26, but the distal end of optic cable 64 has a reflective coating 66 deposited thereon. The reflective coating 66 is a polarization maintaining material that reflects light directly back into fiber optic coil 64 through lens 20 for 45° reflection from beam splitter 14 and then through a quarter wave plate 68 for reflection from mirror 70 back through quarter wave plate 68 and along beam 72 which forms the reactive portion of beam 18. The passage of the beam through quarter wave plate 68 rotates the E-field vector by 45° for each pass through so that the reactive beam 72 will undergo an approximate 90° phase change such that addition of the E-field vectors of beams 72 and 12 as aligned along beam 18 will bring about the Lissajous pattern at the detection circuitry. Thus, the detection circuit processing may be carried out in similar manner to that for the FIG. 1 or FIG. 2 embodiments.

Figure 4:
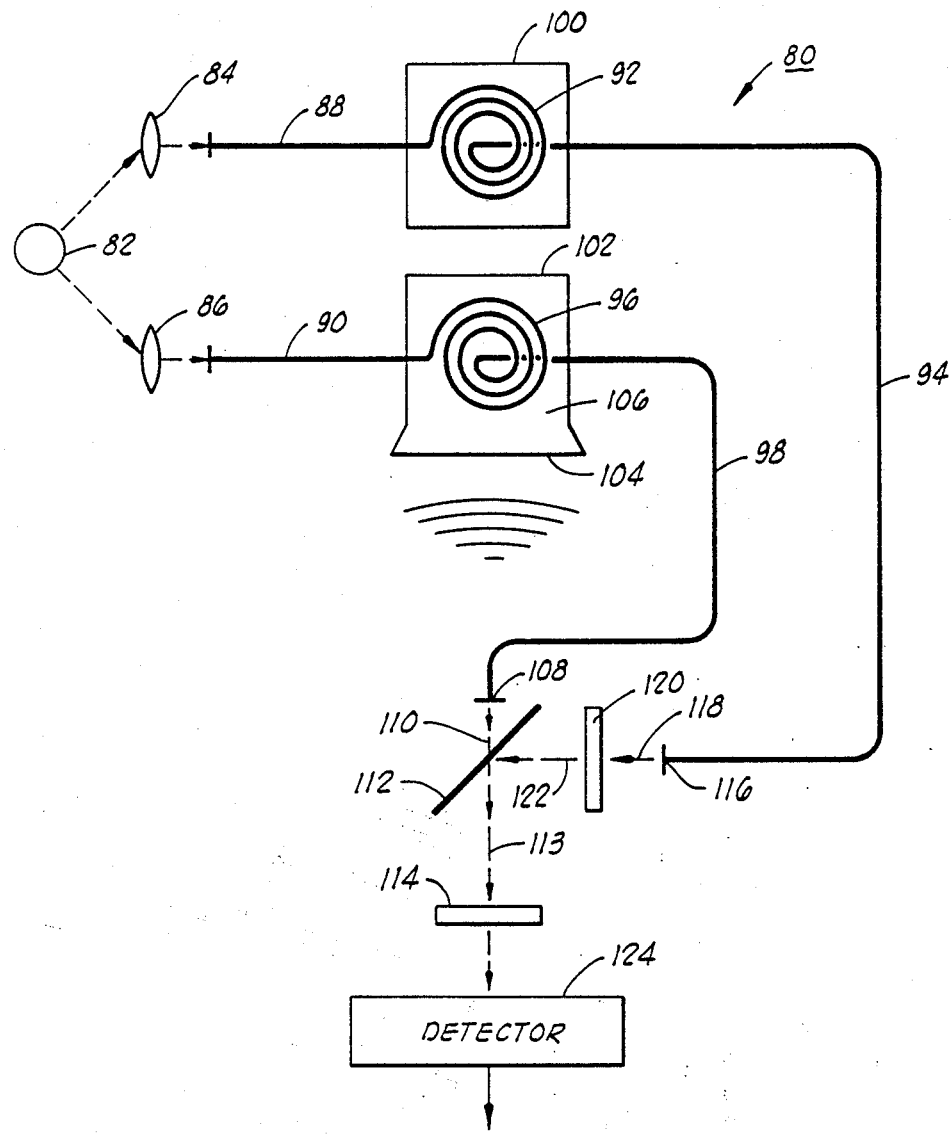
FIG. 4 is a schematic drawing of another alternative form of fiber-optic sensor that uses a sensing cable and a reference cable.

FIG. 4 illustrates a two-coil fiber-optic sensor 80 that utilizes the linear-polarized light with 90° crossed E-field array. Thus, a single-frequency, coherent, linearly polarized light source 82 provides an output beam for focus through respective lenses 84 and 86 into the respective fiber-optic cables 88 and 90. While the output beam from light source 82 is shown as a branch configuration, it should be understood that the output beam could be split and redirected for entry into the respective optic cables using any of a number of well-known optical conduits.

The fiber-optic cable 88 is formed into a fiber coil 92 with output optic cable 94 to function as the reference light. The fiber-optic cable 90 is formed into a fiber coil 96 to provide reactive light indication on output fiber cable 98. Thus, optical coil 92 is situated in a refernce (constant pressure) enclosure 100 while fiber-optic coil 96 is enclosed within enclosure 102 having a sensing diaphragm 104 with a coupling liquid 106 contained therein.

Reactive light output in response to a vibrational disturbance detected at diaphragm 104 is conducted via optic cable 98 to position 108 whereupon the affected light output beam 110 is passed through a beam splitter 112 to impinge on a polarizer 114. The reference light from optic cable 94 is then led to a position 116 to emit light beam 118 through a half-wave plate 120 for impingement at 45° on the beam splitter 112. At beam splitter 112, the reactive light beam 110 is joined in alignment with the reference light 122 for joinder with the light beam 113 proceeding toward polarizer 114. Light output in Lissajous configuration from polarizer 114 is then sensed photoelectrically by a detector 124 for subsequent countdown and analysis by processing circuitry (not shown).

In operation, optic coil 92 functions as a reference isolated from the environment while a sensing coil 96 is acted upon by outside disturbances to change its length or index. Any outside disturbance changing the index of the sensing coil 96 functions to phase modulate the light wave passing through into output optic cable 98. The light beam from the output positions 108 and 116 of the respective optic cables 98 and 94 may then be combined in a 90° phase relationship due to the effects of halfwave plate 120 on the reference light beam. The combined 90° displaced beams are then reflected from beam splitter 112 onto the polarizer 114 whereupon the resultant E-fields trace out the Lissajous pattern. That is, a full circle pattern is the phase between equal orthogonal components is exactly 90°. The axis of polarizer 114 is adjusted to lie midway between the crossed, 90°, linearly polarized light beams making up beam 113 and this light output is sensed by detector 124 to provide an indication of A-C coupled output current that adheres to Equation (6), the expression relating the output wave form as a function of the change in length of the fiber 96.

Here again, the frequency and amplitude of the signal causing the change can be found using this expression for changes in length of up to /2 where is the wave length of light being used. Beyond that, there is no way of knowing if the signal increases or decreases, and this may be overcome by using the "handedness" type of detector as shown in FIG. 2. Thus, in referring to FIG. 2, the combined beam 113 of FIG. 4 would be directed onto the beam splitter 48 which, in conjunction with mirror 54 and respective polarizers 50 and 56 would present the Lissajous patterns to respective detectors 52 and 58 to enable further output processing.

Fiber-optic sensors constructed in accordance with the present invention exhibit an extremely high degree of sensitivity while also having large dynamic range. Such sensors are capable of diminutive construction and are suitable for function in down-hole situations for shear wave detection and for various vertical seismic profiling techniques. A fiber-optic sensor may be employed with a single diaphragm and optic coil to sense one direction of seismic disturbance; or, sensing diaphragms displaced by 180° utilizing two oppositely directed fiber-optic sensing coils may be utilized to gain further dynamic range and sensitivity. Such sensors may engage or couple directly with borehole fluid to sense disturbance. The various aspects of these particular types of borehole devices are more fully discussed in the U.S. application Ser. No. 351,147, filed concurrently herewith and entitled "METHOD AND APPARATUS FOR SENSING DISTURBANCE USING FIBER-OPTIC POLARIZATION ROTATION" (ICR 7622-24).

The foregoing discloses novel method and apparatus for high sensitivity sensing of minute disturbances. The devices utilize fiber-optic coil sensing using linearly polarized light from a coherent light source to develop an E-field vector light pattern that can be photoelectrically detected to yield current indication indicative of proportionate change.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for sensing a physical disturbance, comprising:

a source generating a light beam of single-frequency, coherent, linearly polarized light;

a sealed enclosure filled with coupling fluid, said enclosure having at least one flexible surface for sensing an external disturbance and inducing the disturbance into the coupling fluid;

a fiber optic-sensing coil of preselected diameter and number of turns disposed within said coupling fluid and responsive to any induced disturbance;

optic input means receiving said source light beam and directing same into said fiber optic coil;

optic output means receiving coil light from said fiber optic coil and directing said coil light through a half-wave plate to produce a phase-shifted coil light;

a beam splitter intersecting each of said source light beam and said phase-shifted coil light and directing a combined beam of reference source light and phase-shifted coil light;

polarizer means receiving said combined beam in the form of a Lissajous pattern of light and passing the E-field vector of the combined beam; and a photoelectric detector receiving said combined beam to produce an A-C coupled current output proportional to the change in fiber length of said sensing coil which is proportionate to the amount of disturbance.

2. Apparatus as set forth in claim 1 which is further characterized to include:

a lens receiving and directing said source light from the beam splitter into the optic input means.

3. Apparatus as set forth in claim 1 wherein said optic output means comprises:

a predetermined length of fiber optic cable formed integrally with said fiber optic sensing coil.

4. Apparatus as set forth in claim 1 which is further characterized to include:

processing circuitry for receiving the output from the detector for digitization and digital signal processing to determine the disturbance amplitude and frequency.

5. Apparatus as set forth in claim 1 which further includes:

a second beam splitter intercepting said light of the combined beam from said beam splitter and reflecting a combined beam portion;

a mirror reflecting the combined beam portion;

a second polarizer having axis of polarization shifted by an acute angle from the axis of polarization of said polarizer means, said second polarizer means receiving said combined beam portion;

a second photoelectric detector receiving the combined beam portion with the E-field vector shifted in phase, said second photoelectric detector producing a second current output porportionate to amount of disturbance; and processing circuitry receiving and digitizing each of said photoelectric detector and second photoelectric detector outputs and determining the frequency and amplitude of said disturbance.

6. Apparatus as set forth in claim 1 wherein said optic input means comprises:

a predetermined length of fiber optic cable formed integrally with said fiber optic sensing coil.

7. Apparatus as set forth in claim 6 wherein said optic output means comprises:

a predetermined length of fiber optic cable formed integrally with said fiber optic sensing coil.

8. Apparatus for sensing a physical disturbance, comprising:

a source generating a light beam of single-frequency, coherent, linearly polarized light;

a sealed enclosure filled with coupling fluid, said enclosure having at least one flexible surface for sensing an external disturbance and inducing the disturbance into the coupling fluid;

a fiber-optic sensing coil having first and second ends and a preselected diameter and number of turns which is disposed within said coupling fluid and responsive to any induced disturbance;

optic means receiving said source light beam and directing same into the first end of said fiber optic coil while also emitting any reflected coil light;

optic reflector means deposited on the second end of the sensing coil for receiving light from said fiber optic coil and directing said reflected coil light back through the fiber optic coil;

a beam splitter intercepting each of said source light beam and said reflected coil light and directing a first beam of reference source light and a second beam of reflected coil light;

a reflecting mirror;

a quarter wave plate receiving said second beam to effect E-field rotation of 45° and to direct the light onto said mirror while receiving the reflected rotated light to effect further 45° rotation for redirection through said beam splitter in propagation alignment with said first beam of reference source light to produce a third beam of reference source light plus 90° phase shifted coil light;

polarizer means receiving said third beam in the form of a Lissajous pattern of light and passing the E-field vector of the combined beam; and a photoelectric detector receiving said combined beam to produce an A-C coupled current output proportional to the change in fiber length of said sensing coil which is proportionate to the amount of disturbance.

9. Apparatus as set forth in claim 8 wherein said optic means comprises:

a lens receiving and directing light bidirectionally.

10. Apparatus as set forth in claim 8 which is further characterized to include:

processing circuitry for receiving the output from the detector for digitization and digital signal processing to determine the disturbance amplitude and frequency.

11. Apparatus as set forth in claim 8 which further includes:

a second beam splitter intercepting said light of the combined beam from said beam splitter and reflecting a combined beam portion;

a mirror reflecting the combined beam portion;

a second polarizer having axis of polarization shifted by an acute angle from the axis of polarization of said polarizer means, said second polarizer means receiving said combined beam portion;

a second photoelectric detector receiving the combined beam portion with the E-field vector shifted in phase, said second photoelectric detector producing a second current output porportionate to amount of disturbance; and processing circuitry receiving and digitizing each of said photoelectric detector and second photoelectric detector outputs and determining the frequency and amplitude of said disturbance.

* * * * *